(12) United States Patent
Biran

(10) Patent No.: US 11,799,635 B2
(45) Date of Patent: Oct. 24, 2023

(54) DICTIONARY-ATTACK-RESISTANT DATABASE ENCRYPTION

(71) Applicant: NITROMIA LTD., Tel Aviv (IL)

(72) Inventor: Gera Biran, Beit Zait (IL)

(73) Assignee: NITROMIA LTD., Tel Aviv (IL)

( * ) Notice: Subject to any disclaimer, the term of this patent is extended or adjusted under 35 U.S.C. 154(b) by 53 days.

(21) Appl. No.: 17/616,703

(22) PCT Filed: Jun. 4, 2020

(86) PCT No.: PCT/IL2020/050627
§ 371 (c)(1),
(2) Date: Dec. 6, 2021

(87) PCT Pub. No.: WO2020/245830
PCT Pub. Date: Dec. 10, 2020

(65) Prior Publication Data
US 2022/0321329 A1      Oct. 6, 2022

Related U.S. Application Data

(60) Provisional application No. 62/857,486, filed on Jun. 5, 2019.

(51) Int. Cl.
*H04L 9/08* (2006.01)
*H04L 9/14* (2006.01)

(52) U.S. Cl.
CPC .......... *H04L 9/0825* (2013.01); *H04L 9/0869* (2013.01); *H04L 9/14* (2013.01)

(58) Field of Classification Search
None
See application file for complete search history.

(56) References Cited

U.S. PATENT DOCUMENTS

| | | | |
|---|---|---|---|
| 9,374,373 B1* | 6/2016 | Chan | H04L 9/3247 |
| 9,935,770 B1* | 4/2018 | Juels | H04L 1/00 |
| 2005/0091487 A1* | 4/2005 | Cross | G06F 21/10 |
| | | | 713/193 |
| 2012/0250863 A1* | 10/2012 | Bukshpun | H04L 9/065 |
| | | | 380/278 |
| 2017/0063538 A1* | 3/2017 | Sella | G06F 21/72 |
| 2020/0004970 A1* | 1/2020 | Wang | H04L 9/3268 |
| 2020/0374269 A1* | 11/2020 | Lidman | H04L 63/10 |

* cited by examiner

*Primary Examiner* — Bassam A Noaman
(74) *Attorney, Agent, or Firm* — Mark M. Friedman

(57) ABSTRACT

There is provided an encryption method which comprises, by at least one server including a processing unit and memory, obtaining data, encrypting the data to obtain encrypted data, the encrypting comprising generating encryption keys using a plurality of seeds and a set of encrypting functions, processing the data using at least the encryption keys to generate the encrypted data, generating encrypted data $D_{S,Enc}$ informative of at least some of the plurality of seeds and transmitting the encrypted data and $D_{S,Enc}$ to a host different from the server, thereby enabling decryption of the encrypted data by the host. Corresponding decryption method is provided.

13 Claims, 9 Drawing Sheets

DICTIONARY-ATTACK-RESISTANT DATABASE ENCRYPTION

TECHNICAL FIELD

The presently disclosed subject matter relates, in general, to the field of data encryption.

BACKGROUND

Protection of private data using data encryption is used in various technical fields, both for private purposes (e.g. industry, bank, etc.) and public purposes (e.g. personal data, healthcare data, etc.).

Unauthorized parties (e.g. hackers) constantly develop techniques to decrypt data in order to get access to private data.

For example, a dictionary attack is a form of brute force attack technique for defeating a cipher or authentication mechanism by trying to determine its decryption key or passphrase by trying hundreds or sometimes millions of likely possibilities, such as words in a dictionary.

There is a need to propose new encrypting solutions that can improve resistance to attacks from unauthorized third parties, such as dictionary attacks.

GENERAL DESCRIPTION

In accordance with certain aspects of the presently disclosed subject matter, there is provided an encryption method comprising, by at least one server including a processing unit and memory, obtaining data, encrypting the data to obtain encrypted data, the encrypting comprising generating encryption keys using a plurality of seeds and a set of encrypting functions, and processing the data using at least the encryption keys to generate the encrypted data, generating encrypted data $D_{S,Enc}$ informative of at least some of the plurality of seeds, transmitting the encrypted data and $D_{S,Enc}$ to a host different from the server, thereby enabling decryption of the encrypted data by the host.

According to some embodiments, decrypting $D_{S,Enc}$ requires sequential computation in order to recover the at least some of the plurality of seeds.

According to some embodiments, decrypting $D_{S,Enc}$ does not allow, at least partially, use of parallel computation.

According to some embodiments, encrypting the data involves parallel computation and decryption of $D_{S,Enc}$ does not allow, at least partially, use of parallel computation.

According to some embodiments, generating $D_{S,Enc}$ includes generating an encrypted ordered interdependency between at least one of one or more of the plurality of seeds, and one or more the encryption keys.

According to some embodiments, decryption of $D_{S,Enc}$ to extract a given seed of the plurality of seeds requires prior decryption of one or more other seeds from $D_{S,Enc}$.

According to some embodiments, at least one of generating $D_{S,Enc}$ and encrypting the data involves using an encryption function which is a memory bound function.

According to some embodiments, at selecting an encryption mechanism for generating $D_{S,Enc}$ to impose a minimal time required to decrypt $D_{S,Enc}$ by the host, for a given CPU.

According to some embodiments, obtaining the data comprises obtaining data which is already encrypted.

According to some embodiments, the method comprises for each of a plurality of N seeds $(S_1, \ldots, S_N)$, generating, based on the set of encryption functions, an encryption key $(K_1, \ldots K_N)$, generating a plurality of public keys $K'_1$ to $K'_{N-1}$, each public key encrypting a seed together with an encryption key generated based on another seed, and transmitting at least one unencrypted seed together with the plurality of public keys $K'_1$ to $K'_{N-1}$ to the host.

According to some embodiments, the method comprises obtaining at least two random seeds; from each random seed, generating a hash chain and associated hash chain output, thereby giving rise to an ordered series of seeds and hash chain outputs; for each hash chain, generating a public key according to the hash chain output of the chain and the seed of the next chain, and encrypting data according to the hash chain output; and transmitting the first random seed, each public key and the encrypted data to a remote location.

In accordance with other aspects of the presently disclosed subject matter, there is provided a decryption method comprising, by at least one host operable on a processing unit, obtaining encrypted data generated based on a plurality of seeds and a set of encryption functions, obtaining encrypted data $D_{S,Enc}$ informative of at least some of the plurality of seeds, decrypting $D_{S,Enc}$ to recover the at least some of the plurality of seeds, and decrypting the encrypted data based on the at least some of the plurality of seeds and the set of encryption functions.

According to some embodiments, decrypting $D_{S,Enc}$ requires sequential computation in order to recover the at least some of the plurality of seeds;

According to some embodiments, decrypting $D_{S,Enc}$ does not allow, at least partially, use of parallel computation.

According to some embodiments, decryption of $D_{S,Enc}$ to extract a given seed of the at least some of the plurality of seeds requires prior decryption of one or more other seeds of the plurality of seeds from $D_{S,Enc}$.

According to some embodiments, the set of encryption functions includes a memory bound function, According to some embodiments, $D_{S,Enc}$ is encrypted according to at least one memory bound function.

In accordance with other aspects of the presently disclosed subject matter, there is provided a server including a processing unit and memory configured to, obtain data, encrypt the data to obtain encrypted data, the encrypt comprising generating encryption keys using a plurality of seeds and a set of encrypting functions, processing the data using at least the encryption keys to generate the encrypted data, generate encrypted data $D_{S,Enc}$ informative of at least some of the plurality of seeds, transmit the encrypted data and $D_{S,Enc}$ to a host different from the server, thereby enabling decryption of the encrypted data by the host.

According to some embodiments, decrypting $D_{S,Enc}$ requires sequential computation in order to recover the at least some of the plurality of seeds.

According to some embodiments, decrypting $D_{S,Enc}$ does not allow, at least partially, use of parallel computation.

According to some embodiments, encrypting the data involves parallel computation and decryption of $D_{S,Enc}$ does not allow, at least partially, use of parallel computation.

According to some embodiments, the server is configured to generate an encrypted ordered interdependency between at least one of one or more of the plurality of seeds, and one or more the encryption keys, to obtain $D_{S,Enc}$.

According to some embodiments, decryption of $D_{S,Enc}$ to extract a given seed of the plurality of seeds requires prior decryption of one or more other seeds from $D_{S,Enc}$.

According to some embodiments, at least one of generate $D_{S,Enc}$ and encrypt the data involves using an encryption function which is a memory bound function.

According to some embodiments, the server is configured to obtain data which is already encrypted.

According to some embodiments, the server is configured to, for each of a plurality of N seeds ($S_1, \ldots, S_N$), generate, based on the set of encryption functions, an encryption key ($K_1, \ldots K_N$), generate a plurality of public keys $K'_1$ to $K'_{N-1}$, each public key encrypting a seed together with an encryption key generated based on another seed, and transmit at least one unencrypted seed together with the plurality of public keys $K'_1$ to $K'_{N-1}$ to the host.

In accordance with other aspects of the presently disclosed subject matter, there is provided a host operable on a processing unit, configured to obtain encrypted data generated based on a plurality of seeds and a set of encryption functions, obtain encrypted data $D_{S,Enc}$ informative of at least some of the plurality of seeds, decrypt $D_{S,Enc}$ to recover the at least some of the plurality of seeds, and decrypt the encrypted data based on the at least some of the plurality of seeds and the set of encryption functions.

According to some embodiments, decrypt $D_{S,Enc}$ requires sequential computation in order to recover the at least some of the plurality of seeds.

According to some embodiments, decrypt $D_{S,Enc}$ does not allow, at least partially, use of parallel computation.

According to some embodiments, decrypt of $D_{S,Enc}$ to extract a given seed of the at least some of the plurality of seeds requires prior decryption of one or more other seeds of the plurality of seeds from $D_{S,Enc}$.

According to some embodiments, the set of encryption functions includes a memory bound function.

According to some embodiments, $D_{S,Enc}$ is encrypted according to at least one memory bound function.

In accordance with other aspects of the presently disclosed subject matter, there is provided a non-transitory computer readable medium comprising instructions that, when executed by a processor and memory circuitry (PMC), cause the PMC to perform operations comprising obtaining data, encrypting the data to obtain encrypted data, the encrypting comprising generating encryption keys using a plurality of seeds and a set of encrypting functions, processing the data using at least the encryption keys to generate the encrypted data, generating encrypted data $D_{S,Enc}$ informative of at least some of the plurality of seeds, and transmitting the encrypted data and $D_{S,Enc}$ to a host different from the server, thereby enabling decryption of the encrypted data by the host.

In accordance with other aspects of the presently disclosed subject matter, there is provided a non-transitory computer readable medium comprising instructions that, when executed by a processor and memory circuitry (PMC), cause the PMC to perform operations comprising obtaining encrypted data generated based on a plurality of seeds and a set of encryption functions, obtaining encrypted data $D_{S,Enc}$ informative of at least some of the plurality of seeds, decrypting $D_{S,Enc}$ to recover the at least some of the plurality of seeds, decrypting the encrypted data based on the at least some of the plurality of seeds and the set of encryption functions.

In accordance with other aspects of the presently disclosed subject matter, there is provided a method comprising, by at least one server including a processing unit and memory, obtaining data, encrypting the data to obtain encrypted data, the encrypting comprising generating encryption keys using a plurality of seeds and a set of encryption functions, and processing the data using at least the encryption keys to generate the encrypted data, transmitting the encrypted data and data informative of the plurality of seeds to a host different from the server without transmitting some or all of the encryption keys, wherein the host stores data informative of the set of encryption functions enabling, in conjunction with the data informative of the plurality of seeds, recovering the encryption keys for decryption of the encrypted data.

According to some embodiments, a server configured to perform this method is provided.

According to some embodiments, the proposed solutions provide an encryption solution which is resistant to dictionary attacks.

According to some embodiments, the proposed solution provides an encryption solution which more reliable.

According to some embodiments, the proposed solution provides an encryption solution which increases a time required to decrypt encrypted data by an authorized third party, thereby preventing unauthorized third party to attempt to decrypt the encrypted data.

According to some embodiments, the proposed solution provides an encryption solution which prevents, at least partially, a third party to use rapid computation to decrypt the encrypted data, such as parallel computation, thereby preventing unauthorized third parties to decrypt the encrypted data.

According to some embodiments, the proposed solution provides an encryption time of data which is much lower than a decryption time required to decrypt the encrypted data by a third party, even if the third party is an authorized third party.

According to some embodiments, the proposed solution provides an encryption solution which can tune, in advance, a minimal duration (or an amount of calculation) required to decrypt the encrypted data by an authorized third party. This provides a flexible and efficient solution.

According to some embodiments, the proposed solution provides an encryption solution which can be decrypted only by an authorized third party having access to data and functions used for the encryption.

According to some embodiments, the proposed solution minimizes transmission of data usable for decrypting data between the encryption server and the decryption server, thereby increasing security.

According to some embodiments, the proposed solution provides protection of homomorphic encrypted data (for example in databases), so that the plaintext data can remain secret even if the encrypted data have been obtained by an adversary.

According to some embodiments, the proposed solution enables the party which encrypts the data to select the third party allowed to decrypt the encrypted data.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "encrypting", "decrypting", "generating", "transmitting", "extracting", "recovering", or the like, refer to the action(s) and/or process(es) of a processing unit that manipulate and/or transform data into other data, said data represented as physical, such as electronic, quantities and/or said data representing the physical objects. The term "processing unit" should be expansively construed to cover any kind of hardware-based electronic device with data processing circuitry, which includes for example a computer processing device operatively connected to a computer memory (e.g. digital signal processor (DSP), a microcontroller, a field programmable gate array (FPGA), and an application specific integrated circuit (ASIC), etc.) capable of executing various data processing operations.

It can encompass a single processing unit or multiple processing units, which may be located in the same geographical zone or may, at least partially, be located in different zones and may be able to communicate together.

The terms "non-transitory memory" and "non-transitory computer readable medium" used herein should be expansively construed to cover any volatile or non-volatile computer memory suitable to the presently disclosed subject matter.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
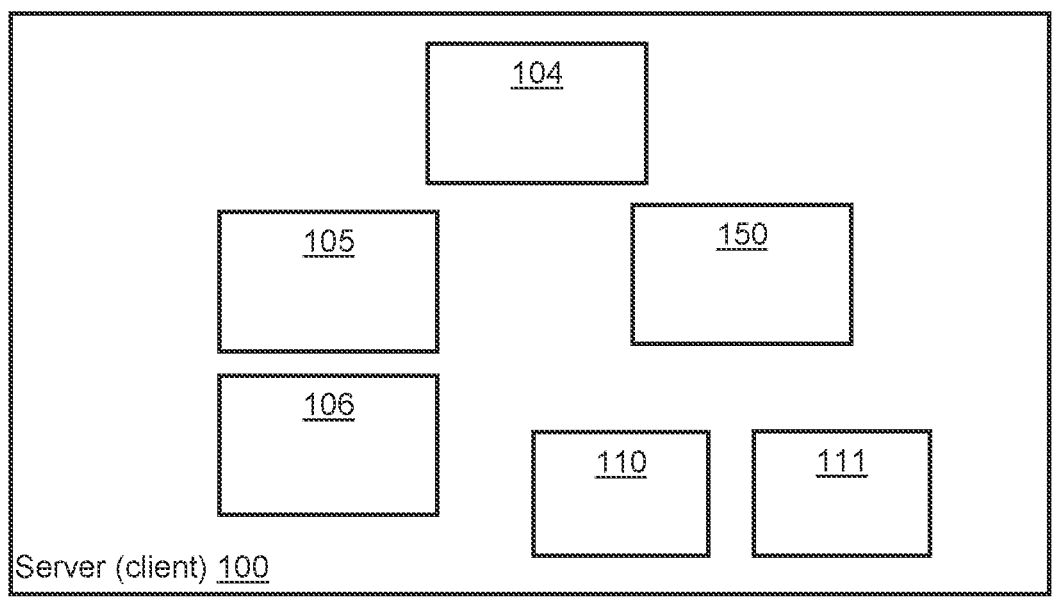
FIGS. 1 and 1A illustrate schematically an architecture of a server (client server)
Figure 1A:
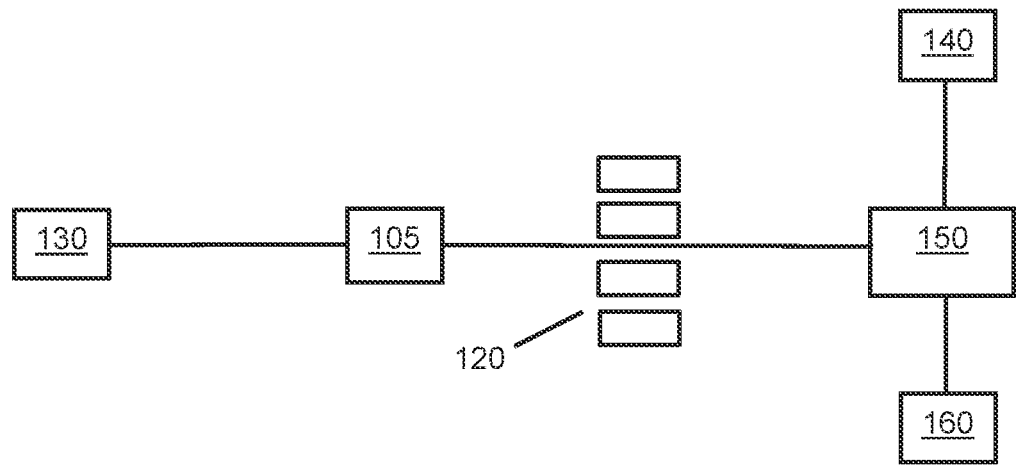

Attention is drawn to FIGS. 1 and 1A, which depict an architecture of a server 100. The server 100 is generally located at the client side, which stores (private) data which requires protection by encryption, before being transmitted to a third party (see hereinafter host 200).

According to some embodiments, the server 100 can correspond to a computing environment that is considered to have a low risk of being compromised.

The server 100 is for example a server operated by a bank, a plant, healthcare institutions, governments, etc. This is however not limitative.

As shown in FIG. 1, the server 100 includes a processing unit 110 and a memory 111.

At least some of the functional modules described hereinafter with reference to the server 100 can be implemented by the processing unit 110 and the associated memory 111.

According to some embodiments, the processing unit 110 includes parallel computation capabilities, such as (but not limited to), GPUs and/or ASIC and/or Quantum computers.

The server 100 can include a key generator 105, configured to generate, based on a plurality of seeds 130 (e.g. random seeds provided to the server 100 and/or generated by the server 100), a plurality of encryption keys 120 (see FIG. 1A). According to some embodiments, the server 100 includes a seed generator 104, operable to generate random seeds 130. Seed generator 104 can e.g. include a pseudo-random number generator, a hardware random number generator (HRNG). These examples re not limitative.

As explained hereinafter, key generator 105 can implement various encryption schemes, such as hashing chains, linear or non-linear combination of hash chains (combined according e.g. to directed graphs), balloon chains, or other one-way functions, etc. When the key generator 105 implements chains (e.g. hash chains, etc.), it can be referred to as a chain generator, or fast chain generator. Similarly, the encryption keys 120 can be referred to as chains, or TIP. An encryption key can be e.g. a string of particular length.

The server 100 can include an encryption module 150, configured to encrypt data 140 (provided to the server 100 and/or stored by the server 100), based on the plurality of encryption keys 120. As a consequence, encrypted data 160 can be obtained. Encryption module 150 can implement various encryption mechanisms, such as XOR, legacy encryption (e.g. AES), RSA, etc. These examples are not limitative.

According to some embodiments, data 140 is already encrypted thereby enabling obtaining encrypted data 160 with a double level of encryption. For example, data 140 can be already encrypted using Homomorphic Encryption, which includes e.g. Fully Homomorphic Encryption (FHE), Partially homomorphic encryption (PHE), DGHV (see Fully Homomorphic Encryption over the Integers, van Dijk, Gentry, Halevi, Vaikuntanathan, Jun. 8, 2010, incorporated herein by reference), etc.

According to some embodiments, the server 100 includes a seed encryption module 106, enabling to encrypt one or more of the plurality of seeds (see hereinafter $D_{S,Enc}$). The seed encryption module 106 can rely on various encryption mechanisms, as explained hereinafter.

The server 100 can generally communicate data with a host 200 (see FIG. 2) different from the server 100, through e.g. wire and/or wireless communication.

Figure 2:
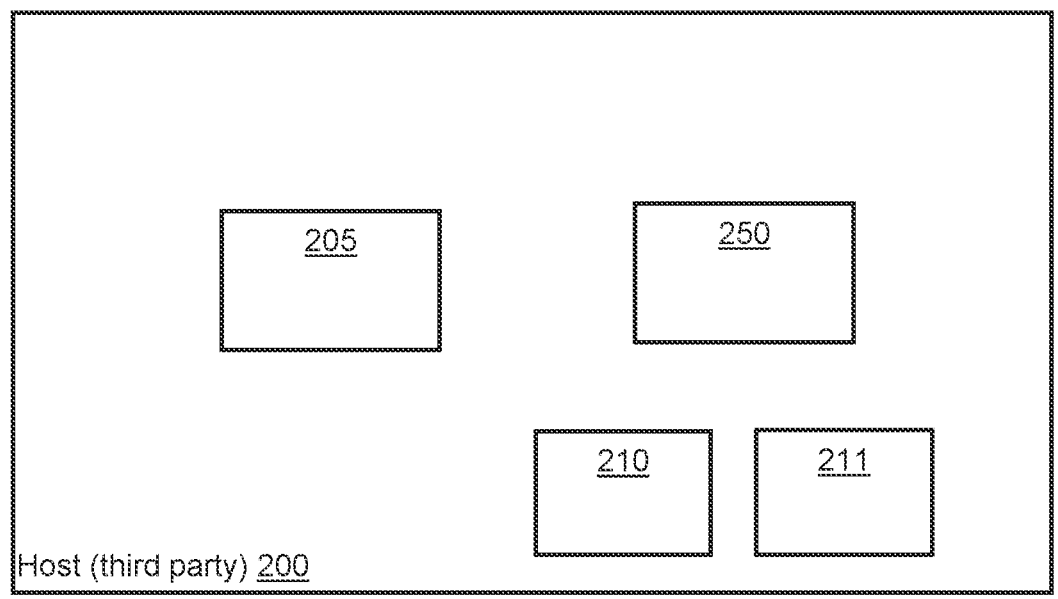
FIGS. 2 and 2A illustrate schematically an architecture of a host (e.g. cloud server)
Figure 2A:
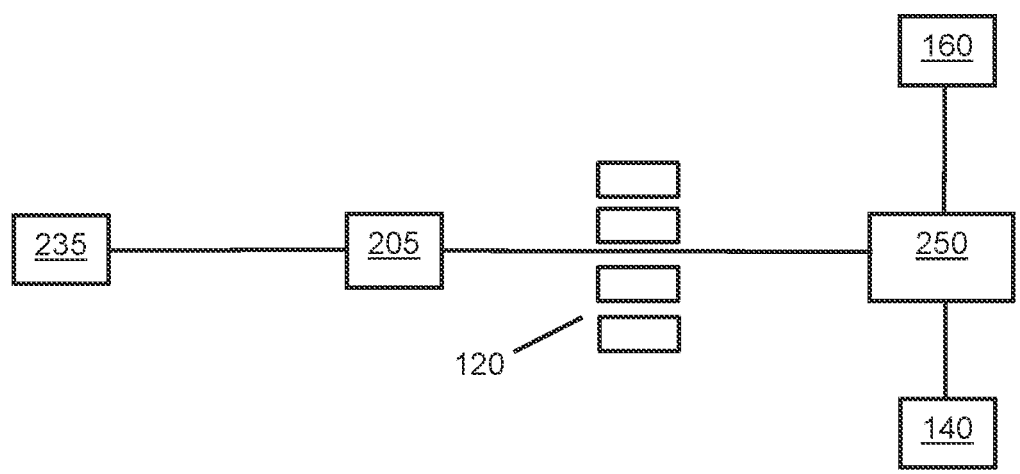

Attention is now drawn to FIGS. 2 and 2A, which depicts an architecture of the host 200.

The host 200 is e.g. operated by a third party.

The host 200 can include e.g. at least one server (which includes processing capabilities, such as a processing unit, and storage capabilities, such as a memory). In some embodiments, the host can include virtual processing resources, such as at least one virtual machine (VM).

A virtual machine (VM) is an emulation of a computer system. Virtual machines are based on computer architectures and provide functionality of a physical computer. Virtual machines generally include computer files that run on a physical computer (or server, or a plurality of computers/servers) and behave like a physical server or computer. Like physical computers, they run applications and an operating system. In some embodiments, a host can include a combination of hardware (e.g. server) and software (virtual machine).

In some embodiments, the host 200 can correspond, for example, to an environment such as a public cloud, private cloud, hybrid cloud, etc. Executable processes and data can be located in virtual machines, containers, server-less execution environments, etc.

According to some embodiments, operator of the server 100 is willing to communicate encrypted data to the host 200, and to allow the host to decrypt (at least partially) the encrypted data. The host 200 is therefore a trusted or authorized third party. According to some embodiments, the host 200 can correspond to a computing environment that is considered to have a higher risk (relative to the server 100) of being compromised. Therefore, various methods of encrypting data to be communicated to the host 200 will be described hereinafter, in order to minimize a risk that an unauthorized third party succeeds in stealing and decrypting the encrypted data.

The host 200 includes (or can communicate with) a processing unit 110 and a memory 111.

The host 200 is operable to receive at least the encrypted data 160 from the server 100. According to some embodiments, and as explained hereinafter, the server 200 is operable to receive data 235 informative of the plurality of seeds used for encrypting the encrypted data 140. Data 235 can include in some embodiments the plurality of seeds 130, and/or only a subset of the seeds 130 and additional data enabling to recover the plurality of seeds. In some embodiments, data 235 can include encrypted data informative of the plurality of seeds (referred to as $D_{S,Enc}$).

At least some of the functional modules described hereinafter with reference to the second server 200 can be implemented by the processing unit 210 and the associated memory 211.

According to some embodiments, in contradiction to the server 100, the processing unit 210 does not include parallel computation capabilities (such as GPUs and/or ASIC and/or Quantum computers), and/or includes parallel computation capabilities but cannot use them for decrypting at least part of the encrypted data 160, and in particular, for decrypting data 235 (required to decrypt encrypted data 160), as explained hereinafter. This will be discussed more in details hereinafter.

The server 210 includes a key generator 205. According to some embodiments, the key generator 205 is configured to generate, based on data 235 informative of the plurality of seeds, the plurality of encryption keys 120 generated by the server 100. In other words, it is able to recover the encryption keys 120. According to some embodiments, the key generator 205 is slow in generating the encryption keys 120, relative to key generator 105 (which was able to generate the encryption keys 120 quicker). This can be due in particular to the encryption performed by the server 100, which prevents the host 200 to decrypt fast the encrypted data, although the host 200 is an authorized third party.

According to some embodiments, the key generator 205 stores the same encryption functions implemented by the key generator 105. For example, when operator of the server 100 has selected the encryption functions which need to be used to generate encrypted data, these encryption functions can be transmitted (once) to the host 200. When the key generator 205 implements chains (e.g. hash chains, etc.), it can be referred to as a chain generator, or slow chain generator.

The host 200 can include a decryption module 250, configured to decrypt encrypted data 160, based on the plurality of encryption keys 120 recovered by the key generator 205. The decryption module 250 can implement in particular a decryption mechanism which is operative to decrypt data encrypted using an encryption mechanism of the encryption module 150 of the server 100. For example, if the encryption module 150 implements a XOR function, then the decryption module 250 can also implement a XOR function.

As a consequence, the host 200 can recover the data 140, before their encryption by the server 100. As mentioned above, the data 140 can be, in some embodiments, plaintext, or encrypted data (in this case the host 200 has removed the second, or more generally $N^{th}$, encryption).

Figure 3:
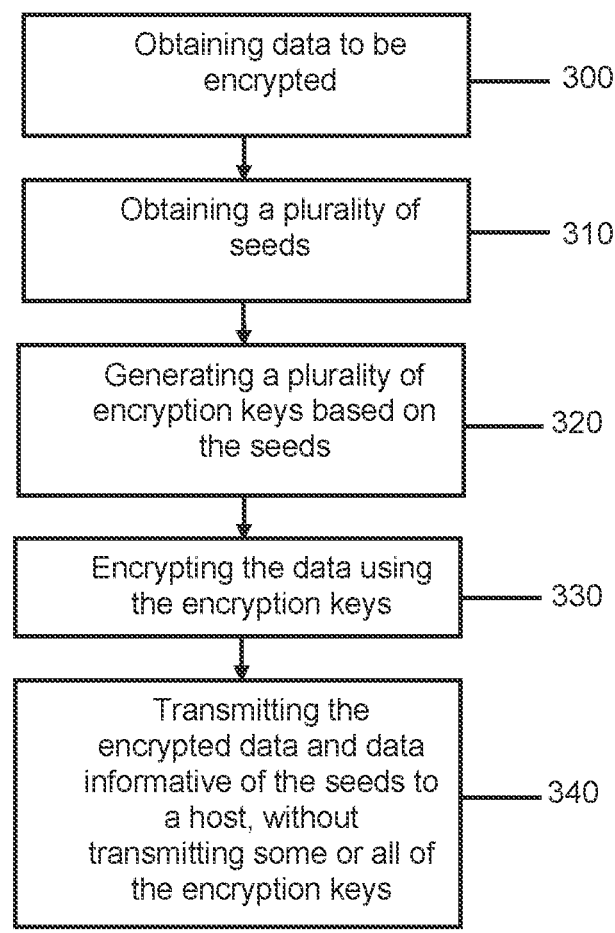
FIG. 3 illustrates a generalized flow-chart of an encryption method of data exchanged between a server and a third-party host.

Attention is now drawn to FIG. 3. The method of FIG. 3 can be performed, at least partially, by the server 100 (see e.g. above description of functional modules of the server 100).

A method includes obtaining (operation 300) data (see reference 140) to be encrypted. In some embodiments, data can correspond to unencrypted data, and in other embodiments, data can correspond to encrypted data (which are processed to perform a double level encryption), such as data encrypted according to a homomorphic encryption scheme.

The method further includes (operation 310) obtaining a plurality of seeds (see reference 130). Seeds correspond e.g. to numbers randomly generated. Operation 310 can include e.g. generating seeds by the server 100, and/or obtaining seeds by another trusted server in communication with the server 100.

The method further includes generating (operation 320) a plurality of encryption keys (see reference 120) using the plurality of seeds. Operation 320 can be performed by the key generator 105. In other words, the plurality of encryption keys 120 correspond to one time passwords (OTP).

According to some embodiments, the key generator 105 implements (as encryption functions) on one or more hash chains. A chain is a data structure which repeatedly executes a function starting from a seed value, using the output of the previous iteration as the input of the next iteration. A hash chain is a successive application of a cryptographic hash function H to an input X. For example, H(H(H(H(X)))) is a hash chain of length equal to four. The term "TIP" refers to the final output of a hash chain.

According to some embodiments, the key generator 105 implements (as one or more of the encryption functions) balloon hashing. Balloon hashing is an encryption method described in "*Balloon Hashing: A Memory-Hard Function Providing Provable Protection Against Sequential Attacks*, Dan Boneh, Henry Corrigan-Gibbs, and Stuart Schechter", incorporated herein by reference. A benefit of balloon hashing is that decrypting the data by an unauthorized third party requires a very large amount of computer memory, which is not available even if the unauthorized third party uses a large amount of servers/computers.

In some embodiments, the key generator 105 implements hash chains, wherein one or more of the hash chains includes balloon hashing.

In some embodiments, the key generator 105 includes an encryption mechanism which can be described by a linear graph (e.g. a chain function, which can be described by a line in which each node of the graph is connected to another single node of the graph), or by more complicated directed graph (which includes e.g. a leaf node connected to a plurality of parent nodes, and/or a parent node connected to a plurality of nodes). In a graph, value of each child node is obtained based on a function of the values of the parent node(s), until the final output (which corresponds to the encryption key) of the graph is reached.

An example of a directed graph includes binary hashed chains. Other examples, which are more complicated (and can be viewed e.g. as a superset of the binary hashed chains), and therefore increases decryption time, can be used. For example, this can include generating different hash chains, and then concatenating their output, the output being used e.g. as an address of another graph to obtain the final output used as the encryption key. This is however not limitative.

The method further includes processing (operation 330) the data using the encryption keys to generate encrypted data 160. In particular, this can include encrypting the data 140 based on the encryption keys 120. Operation 330 can be performed by the encryption module 150. Examples of encryption mechanisms which can be implemented by the encryption module 150 have been provided above (e.g. XOR, RSA, etc.). In other words, ready-to-use data 140 is converted into unusable data 160.

The method further includes transmitting (operation 340) the encrypted data 160 and data 235 informative of the plurality of seeds 130 to the second server 200, for decryption by the second server 200. In particular, data 235 is sent only when the server 100 considers that the host 200 should start decrypting data.

If the encrypted data has been encrypted with a double level of encryption, then the host 200 is configured to decrypt the second level of encryption. According to some embodiments, the host 120 stores data informative of the encryption functions used by the server 100, but does not receive (in an explicit form) from the server 100 some or all of the encryption keys 120.

In some embodiments, data 235 includes all of the plurality of seeds 130 obtained at operation 300. In other embodiments, and as described hereinafter, data 235 includes at least one seed and additional encryption data, wherein the key generator 205 can recover the plurality of seeds 130 based on data 235 and the encryption functions implemented by the key generator 205, similarly to the first key generator 105.

Data 235 enables, in conjunction with data informative of the encryption functions, to recover the encryption keys 120, and therefore, to decrypt the encrypted data 160.

Figure 4:
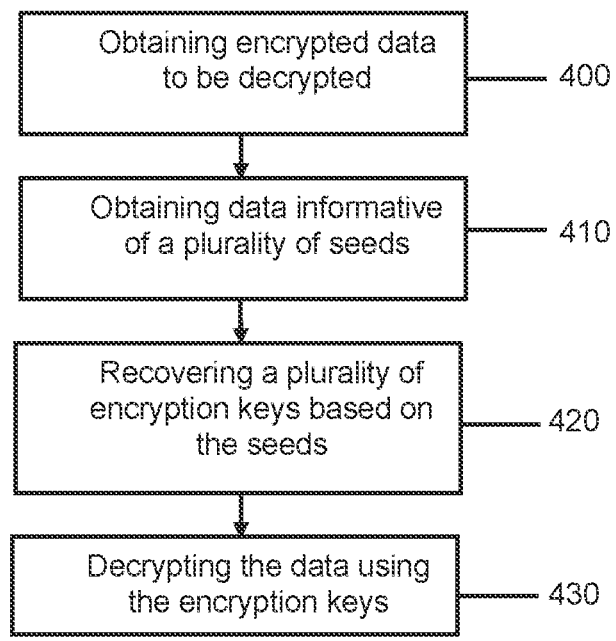
FIG. 4 illustrates a generalized flow-chart of a decryption method of data encrypted according to the method of FIG. 3.

A method of decrypting the encrypted data 160 is described with reference to FIG. 4. The method of FIG. 4 can be performed at least partially by the host 200.

A method includes obtaining (operation 400) encrypted data (see reference 160) to be decrypted. The encrypted data can be transmitted by the server 100 to the host 200.

The method further includes (operation 410) obtaining data 235 informative of the plurality of seeds used by the server 100 to generate the encryption keys 120.

The method further includes recovering (operation 420) the plurality of encryption keys (see reference 120) using data 235 informative of the plurality of seeds. Operation 420 can be performed by the key generator 205.

If the key generator 105 implements given hash chains (e.g. linear hash chains, balloon chains, etc.), then the key generator 205 implements the same given hash chains.

In some embodiments, data 235 does not include explicitly all the seeds, but only one or more of the seeds, and additional data enabling recovering all the seeds. Therefore, at the host side, it is necessary to recover all seeds based on data 235, and based on the recovered seeds, it is possible for the host to recover the encryption keys 120.

Figure 5:
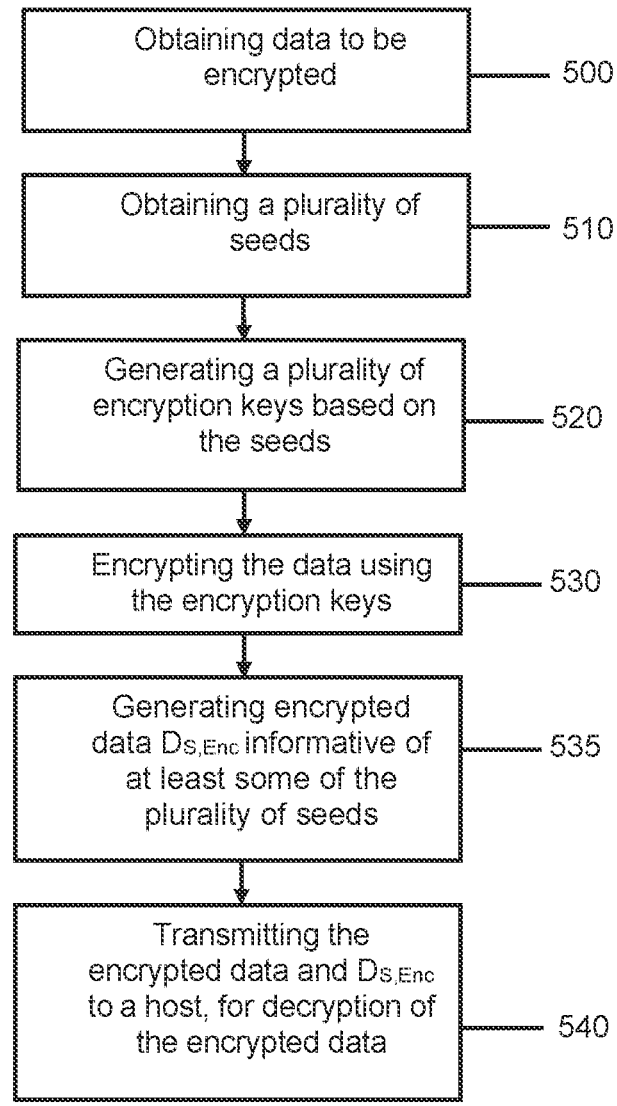
FIG. 5 illustrates a generalized flow-chart of another encryption method of data exchanged between a server and a third-party host.
Figure 6:
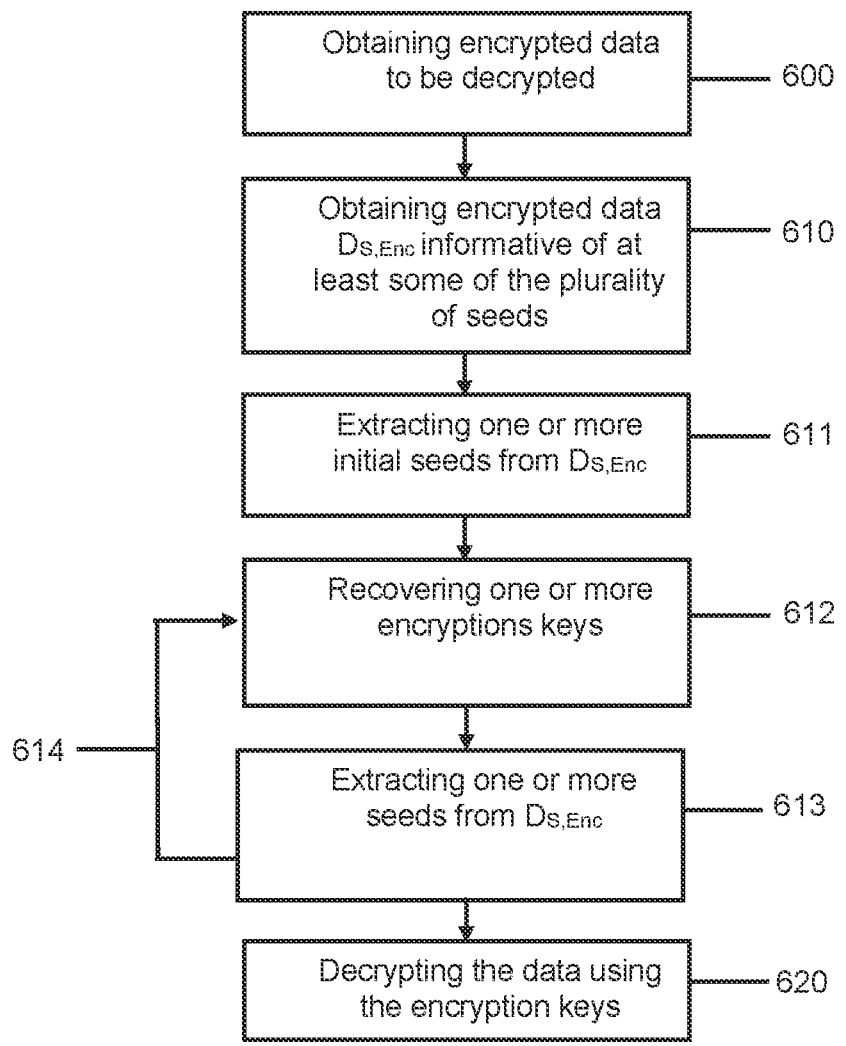
FIG. 6 illustrates a generalized flow-chart of a decryption method of data encrypted according to the method of FIG. 5.

For example, at the client side (server 100), one or more of the seeds 130 has been further encrypted, and data 235 include the encrypted seeds, which need to be further decrypted by the host 200, as explained in particular with reference to FIGS. 5 and 6.

The method further includes processing (operation 430) the encrypted data 160 using the (recovered) encryption keys 160 to recover decrypted data 140. Decrypted data 140 can be plain text, or can be still encrypted if the original data 140 was already encrypted once.

In particular, this can include decrypting the data 160 based on the encryption keys 120. Operation 420 can be performed by the decryption module 250.

If the encrypted data has been encrypted with a double level of encryption, then the host 200 is configured to decrypt the second level of encryption. In some embodiments, even if data 140 is still encrypted after being recovered by the host 200, it can be useful as such, e.g. by the host 200 (in contradiction with data 160 which cannot be used as such).

Attention is now drawn to FIG. 5.

A method includes obtaining (operation 500) data (see reference 140) to be encrypted.

The method further includes (operation 510) obtaining a plurality of seeds (see reference 130). Operation 510 is similar to operation 310 (one can refer to the description of operation 310).

The method further includes generating (operation 520) a plurality of encryption keys (see reference 120) using the plurality of seeds. Operation 520 is similar to operation 320 (one can refer to the description of operation 520).

The method further includes processing (operation 530) the data using the encryption keys 120 to generate encrypted data 160. Operation 530 is similar to operation 330.

The method further includes generating (operation 535) encrypted data $D_{S,Enc}$ informative of the plurality of seeds. In some embodiments, all seeds are encrypted, and in other embodiments, only part of the seeds is encrypted. In other words, the seeds are not transmitted from the server 100 to the host 200 in an explicit (unencrypted) way, but rather in an encrypted form.

In particular, according to some embodiments, $D_{S,Enc}$ is encrypted using an encryption mechanism such that decryption of $D_{S,Enc}$ by the host 200 requires sequential computation, and prevents, at least partially, or even totally, use of parallel computation by the host 200 when decrypting $D_{S,Enc}$. Various embodiments will be provided hereinafter.

According to some embodiments, encryption of the plurality of seeds to obtain $D_{S,Enc}$ includes generating an encryption including an ordered interdependency between one or more of the plurality of seeds. In other words, because of the ordered interdependency present in the encryption, it is not possible to decrypt all the seeds in parallel, but it is required to decrypt (at least part of) the seeds sequentially, according to the ordered interdependency.

According to some embodiments, encryption of the plurality of seeds to obtain $D_{S,Enc}$ comprises generating an encryption including an ordered interdependency between one or more of the plurality of seeds and one or more of the plurality of encryption keys.

According to some embodiments, $D_{S,Enc}$ is encrypted such that for each of one or more of the plurality of seeds used by the server 100, decryption of a given seed from $D_{S,Enc}$ requires prior decryption of another seed of the plurality of seeds. For example, if $D_{S,Enc}$ uses an encryption mechanism described by a directed graph, then it is not possible to reach intermediate nodes of the graph without generating beforehand all parent nodes of these intermediate nodes.

According to some embodiments, assume that each seed of the plurality of seeds ($S_1$ to $S_N$) is associated with a corresponding encryption key ($K_1$ to $K_N$) (as generated in operation 520). According to some embodiments, encryption of the seeds includes generating an ordered interdependency between $S_j$ (with j>1) and $K_i$ (with i<j). As a consequence, when the host 200 attempts to extract $S_j$ from $D_{S,Enc}$, it is forced to first generate $K_i$. However, $K_i$ cannot be generated without extracting $S_i$ (since $K_i$ is the encryption key obtained by applying the encryption functions implemented by the key generator 105 to $S_i$). As a consequence, the host 200 cannot generate in parallel $S_j$ and $S_i$, and is forced to use sequential computation, which takes much more time than parallel computation.

To the contrary, the server 100 can use parallel computation to generate the different encryption keys 120 based on the plurality of seeds 130.

Assume for example that the server 100 generates 10,000 encryption keys based on 10,000 seeds. Assume that encrypted data $D_{S,Enc}$ informative of the plurality of seeds is generated and transmitted to the host 200, wherein $D_{S,Enc}$ forces the host 200 to use sequential computation (and not parallel computation) as mentioned above. Assume that the server 100 and the host 200 share similar CPU capabilities—as a consequence, the process of decrypting the data at the host 200 is at least 10,000 times slower than the process of encrypting the data at the server 100.

According to some embodiments, operator of the server 100 can establish in advance, when generating $D_{S,Enc}$ minimal time $T_{min}$ (for a given CPU) required for decrypting $D_{S,Enc}$ and/or the encrypted data 160. Indeed, since $D_{S,Enc}$ forces the host 200 to use (at least partially) sequential computation, and the number of seeds 130 and encryption keys 120 is known, and time for generating a given encryption key based on a given seed is known (since the encryptions functions are known), it is possible to determine in advance $T_{min}$.

$T_{min}$ can be selected by an operator of the server 100 by selecting appropriate encryption mechanism of the seeds when generating $D_{S,Enc}$. Therefore, it is possible to impose a minimal time required to decrypt $D_{S,Enc}$ by the host 200, for a given CPU.

Even the host 200, which is an authorized third party, cannot decrypt the encrypted data within a time less than $T_{min}$. An attacker, who would attempt to steal data from the host 200, would take a time much larger than $T_{min}$, thereby efficiently preventing from third party attack.

According to some embodiments, generating of $D_{S,Enc}$ includes using an encryption function which is a memory bound (one way) function. An example of memory bound functions includes balloon chain (see above). In this type of encryption functions, it does not matter whether the server which attempts to decrypt the data increases its CPU (e.g. by using very high CPU servers), since this will not increase substantially the speed of decryption. This type of encryption function requires in fact increase of the memory. However, for an unauthorized third party, size of memory which is required is practically impossible to obtain. Therefore, this further prevents an unauthorized third party to steal and decrypt the data, and in particular, $D_{S,Enc}$ which is mandatory to obtain the seeds and the encryption keys.

According to some embodiments, generation of $D_{S,Enc}$ includes using an encryption mechanism complying with a graph, e.g. a directed graph (see description above). This can include e.g. a binary hash chain graph, and more generally a directed graph chain.

The method further includes transmitting (operation 540) the encrypted data 160 and $D_{S,Enc}$ to the host 200, for decryption by the host 200.

Attention is now drawn to FIG. 6 which describes a method of decryption of encrypted data as generated according to the method of FIG. 5. The method can be performed at least partially by the host 200.

The method includes obtaining (operation 600) encrypted data (see reference 160) to be decrypted. The encrypted data can be transmitted by the server 100 to the host 200.

The method further includes (operation 610) obtaining encrypted data $D_{S,Enc}$ informative of the plurality of seeds used by the server 100 to generate the encryption keys 120.

The method further includes (operation 611), obtaining one or more initial seeds allowing starting the decryption process. In some embodiments, the initial seed(s) is/are received unencrypted, and in other embodiments, the initial seed(s) is/are received encrypted. e.g. as part of $D_{S,Enc}$.

Based on the initial seed(s), it is possible to recover (operation 612) one or more encryption keys associated with these initial seeds. This can include using the key generator 205, which implements the encryption functions of the key generator 105, to convert the initial seed(s) to encryption key(s) (see operation 420). Then a sequential process (sequential computation—see reference 614) can be performed, in which the encryption keys then enable to decrypt additional seeds (operation 613), which in turn allow to generate additional encryption keys (operation 612), which in turn enable to decrypt additional seeds (operation 613), etc.

The sequential computation can be repeated until all the encryption keys have been recovered.

The method further includes processing (operation 620) the encrypted data 160 using the (recovered) encryption keys 160 to recover decrypted data 140. Decrypted data 140 can be plain text, or can be still encrypted if the original data 140 was already encrypted once.

Decryption of the encrypted data 160 using the recovered encryption keys 120 can be performed sequentially (each time an encryption key is obtained at operation 612) or at the end, once all encryption keys have been recovered.

Figure 7:
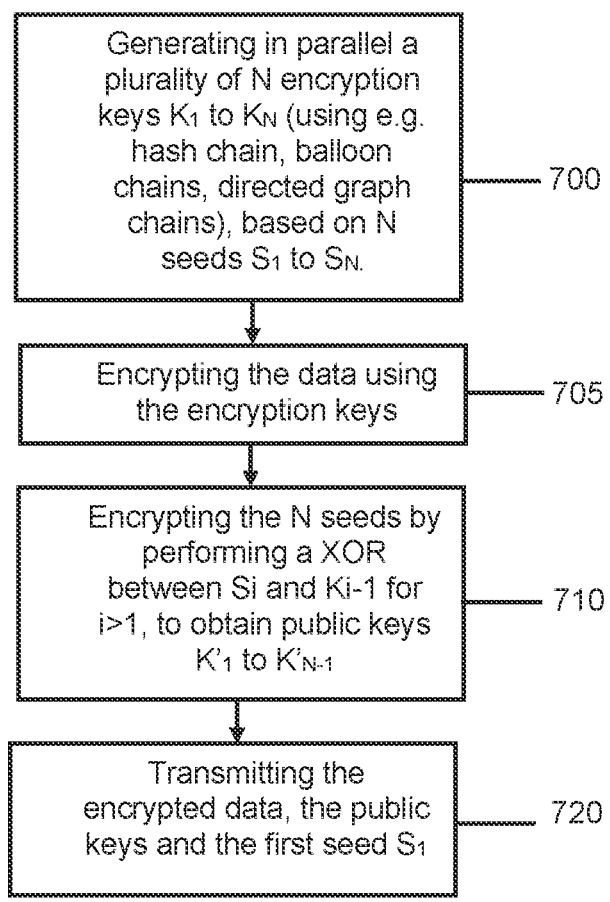
FIG. 7 illustrates a generalized flow-chart of an example of an encryption method in compliance with the method of FIG. 5.

Attention is now drawn to FIG. 7, which can be performed, at least partially, by the server 100.

A method includes generating (operation 700), based on a plurality of seeds ($S_1$ to $S_N$), a plurality of N encryption keys ($K_1$ to $K_N$, which each correspond e.g. to a TIP of one or more chains). For example, N is equal to 1,000. In some examples, the encryption functions used for this encryption involve hash chain and/or balloon chains and/or directed graph chains. In some embodiments, the N encryption keys can be generated in parallel. This can be done with speed and efficiency because at the server (client platform), it is possible to generate the multiple directed graphs (or other encryption functions as explained above) based on each seed in parallel.

The method further includes encrypting (operation 705) data (see reference 140) based on the encryption keys 120 used as one time passwords, as explained e.g. with reference to operation 330.

The method further includes encrypting (operation 710) the seeds 130 used for generating the encryption keys 120. This can include e.g. performing a XOR function between each seed $S_i$ (for i>1) with the encryption key $K_{i-1}$ and save the result for use as a "public key" $K'_i$ (these "public keys" are not to be confused with the public keys used public key cryptography). As a consequence, N−1 public keys $K'_1$ to $K'_{N-1}$ are obtained.

The method further includes transmitting (operation 720) the encrypted data, the first seed $S_1$ and the N−1 public keys $K'_1$ to $K'_{N-1}$ to the host 200. In other words, the first seed $S_1$ and the N−1 public keys $K'_1$ to $K'_{N-1}$ are an example of $D_{S,Enc}$ mentioned above.

In some embodiments, the method can be implemented as follows, and includes obtaining at least two (random) seeds. The method includes, from each random seed, generating a hash chain and associated hash chain output (TIP), thereby giving rise to an ordered series of seeds and hash chain outputs. For each hash chain, the method includes generating a public key based on the hash chain output (encryption key used for encrypting data 140 at the server 100) of the chain and the seed of the next chain. The method further includes transmitting the first random seed, each public key and the encrypted data 160 to a remote location, such as host 200.

Figure 8:
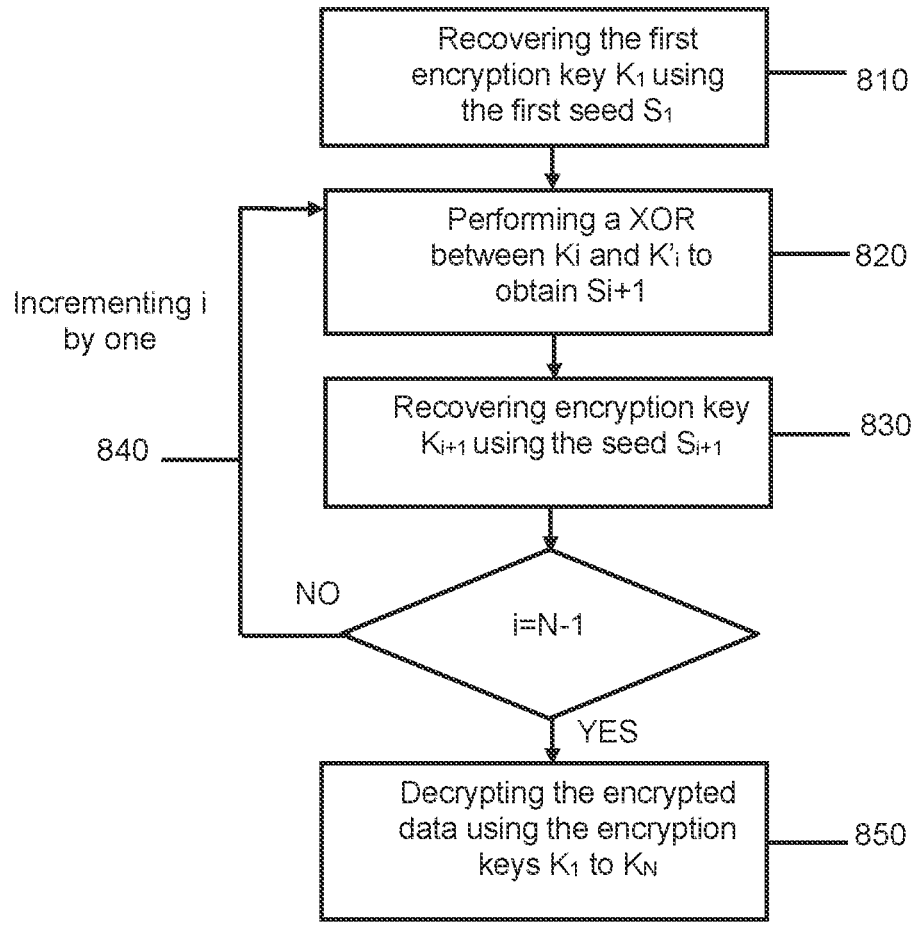
FIG. 8 illustrates a generalized flow-chart of an example of a decryption method in compliance with the method of FIG. 6.

Attention is now drawn to FIG. 8.

The host 200 receives the encrypted data, the first seed $S_1$ and the N−1 public keys $K'_1$ to $K'_{N-1}$.

At operation 810, the first seed $S_1$ is used by the key generator 205 to generate associated encryption key (e.g. TIP of the hash chain) $K_1$. For example, if the encryption function which was used at the server 100 to generate $K_1$ is a hash chain, then the host 200 uses the same hash chain generation process (which includes repeatedly applying the hash chain function) to generate $K_1$.

A sequential process is then performed. Assume that i is first set equal to 1. At operation 820, the method includes performing a XOR between the public key $K'_i$ and the seed $S_i$. The output is the seed $S_{i+1}$, which is now available. Seed $S_{i+1}$ is used to generate the corresponding encryption key $K_{i+1}$ (operation 830), and in turn a XOR (for example) is performed between $K'_{i+1}$ and $S_{i+1}$ to generate $S_{i+2}$ (see repetition of the process at operation 840).

The sequential process is repeated once all encryption keys $K_1$ to $K_N$ are recovered (or is stopped beforehand if necessary).

The encryption keys $K_1$ to $K_N$ are used by the decryption module 250 to generate the decrypted data (as already mentioned above, in some embodiments, the decrypted data correspond to plain text, and in other embodiments, the decrypted data are still unencrypted but the second encryption has been removed).

As shown, the decryption process at the host 200 is sequential, and therefore slow. The host 200 cannot use (or does not implement) parallel computing capabilities, such as GPUs, ASICs or Quantum computer. In some embodiments, if balloon chain encryption (or other memory bound functions) has been used to encrypt the seeds when generating $D_{S,Enc}$ (and/or to generate the encryption keys based on the seeds), the host 200 must use a large amount of memory.

The encryption keys are used to decrypt the encrypted data (see operation 850, similar to operations 430 and 620)

Encryption (and decryption) of the seeds as described in FIGS. 7 and 8 is a mere example and is not limitative.

Various other encryption mechanisms can be used, such as making decryption of a given seed dependent from a plurality of other previous seeds and/or encryption keys. This dependency can use various functions such as linear functions, non-linear functions, directed graph chains, hash chains, balloon chains, etc.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. An encryption method
    comprising, by at least one server including a processing unit and memory:
    obtaining data,
    encrypting the data to obtain encrypted data, the encrypting comprising:
    generating encryption keys using a plurality of seeds and a set of encrypting functions, and
    processing the data using at least the encryption keys to generate the encrypted data,
        generating encrypted data $D_{S,Enc}$ informative of at least some of the plurality of seeds,
        transmitting the encrypted data and $D_{S,Enc}$ to a host different from the server, thereby enabling decryption of the encrypted data by the host;
    for each of a plurality of N seeds ($S_1$, . . . , $S_N$), generating, based on the set of encrypting functions, an encryption key ($K_1$, . . . $K_N$),
    generating a plurality of public keys $K'_1$ to $K'_{N-1}$, each public key encrypting a seed together with an encryption key generated based on another seed, and
    transmitting at least one unencrypted seed together with the plurality of public keys $K'_1$ to $K'_{N-1}$ to the host.

2. The method of claim 1, including at least one of (i), (ii) and (iii):
    (i) decrypting $D_{S,Enc}$ requires sequential computation in order to recover the at least some of the plurality of seeds;
    (ii) decrypting $D_{S,Enc}$ does not allow, at least partially, use of parallel computation; and
    (iii) encrypting the data involves parallel computation and decryption of $D_{S,Enc}$ does not allow, at least partially, use of parallel computation.

3. The method of claim 1, wherein generating DS,Enc includes generating an encrypted ordered interdependency between at least one of one or more of the plurality of seeds, and one or more of the encryption keys.

4. The method of claim 1, wherein decryption of $D_{S,Enc}$ to extract a given seed of the plurality of seeds requires prior decryption of one or more other seeds from $D_{S,Enc}$.

5. The method of claim 1, wherein at least one of generating $D_{S,Enc}$ and encrypting the data involves using an encryption function which is a memory bound function.

6. The method of any of claim 1, including selecting an encryption mechanism for generating $D_{S,Enc}$ to impose a minimal time required to decrypt $D_{S,Enc}$ by the host, for a given CPU, said minimal time being tuneable.

7. The method of claim 1, wherein obtaining the data comprises obtaining data which is already encrypted.

8. A server including a processing unit and memory configured to:
  obtain data,
  encrypt the data to obtain encrypted data, the encrypt comprising:
  generating encryption keys using a plurality of seeds and a set of encrypting functions,
  processing the data using at least the encryption keys to generate the encrypted data,
    generate encrypted data $D_{S,Enc}$ informative of at least some of the plurality of seeds,
    transmit the encrypted data and $D_{S,Enc}$ to a host different from the server, thereby enabling decryption of the encrypted data by the host;
  for each of a plurality of N seeds (S1, ..., SN), generate, based on the set of encrypting functions, an encryption key ($K_1$, ... $K_N$),
  generate a plurality of public keys $K'_1$ to $K'_{N-1}$, each public key encrypting a seed together with an encryption key generated based on another seed, and
  transmit at least one unencrypted seed together with the plurality of public keys $K'_1$ to $K'_{N-1}$ to the host.

9. The server of claim 8, wherein at least one of (i), (ii) and (iii) is met:
  (i) decrypting $D_{S,Enc}$ requires sequential computation in order to recover the at least some of the plurality of seeds;
  (ii) decrypting $D_{S,Enc}$ does not allow, at least partially, use of parallel computation; and
  (iii) encrypting the data involves parallel computation and decryption of $D_{S,Enc}$ does not allow, at least partially, use of parallel computation.

10. The server of claim 8, configured to generate an encrypted ordered interdependency between at least one of one or more of the plurality of seeds, and one or more of the encryption keys, to obtain DS,Enc.

11. The server of claim 8, wherein decryption of $D_{S,Enc}$ to extract a given seed of the plurality of seeds requires prior decryption of one or more other seeds from $D_{S,Enc}$.

12. The server of claim 8, wherein at least one of generate $D_{S,Enc}$ and encrypt the data involves using an encryption function which is a memory bound function.

13. The server of claim 8, configured to obtain data which is already encrypted.

* * * * *